United States Patent
Lee

(10) Patent No.: US 10,310,769 B2
(45) Date of Patent: Jun. 4, 2019

(54) MEMORY SYSTEM AND OPERATING METHOD THEREOF USING A BITMAP FOR FILTERING OF LOGICAL ADDRESSES

(71) Applicant: SK hynix Inc., Gyeonggi-do (KR)

(72) Inventor: Jong-Min Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 331 days.

(21) Appl. No.: 15/096,160

(22) Filed: Apr. 11, 2016

(65) Prior Publication Data

US 2017/0139646 A1    May 18, 2017

(30) Foreign Application Priority Data

Nov. 18, 2015 (KR) .................... 10-2015-0161626

(51) Int. Cl.
| | |
|---|---|
| *G06F 3/06* | (2006.01) |
| *G06F 12/02* | (2006.01) |
| *G06F 12/0802* | (2016.01) |
| *G06F 12/1009* | (2016.01) |
| *G06F 12/1018* | (2016.01) |

(52) U.S. Cl.
CPC .......... *G06F 3/0659* (2013.01); *G06F 3/064* (2013.01); *G06F 3/0608* (2013.01); *G06F 3/0626* (2013.01); *G06F 3/0679* (2013.01); *G06F 3/0685* (2013.01); *G06F 12/0246* (2013.01); *G06F 12/0802* (2013.01); *G06F 12/1018* (2013.01); *G06F 12/1009* (2013.01); *G06F 2212/1016* (2013.01); *G06F 2212/60* (2013.01); *G06F 2212/7201* (2013.01)

(58) Field of Classification Search
CPC ............. G06F 12/0253; G06F 12/0246; G06F 12/0802; G06F 12/1009; G06F 12/1018; G06F 2212/1016; G06F 2212/60; G06F 2212/1056; G06F 2212/651; G06F 2212/657; G06F 2212/7201; G06F 2212/7203; G06F 3/0659; G06F 3/0679; G06F 3/064; G06F 3/0608; G06F 3/0685; G06F 12/101; G06F 3/0626; G06F 3/061; G06F 3/0616; G06F 3/0673; G11C 16/10; G11C 16/0483
USPC ................................. 711/103, 154, 205–209
See application file for complete search history.

(56) References Cited

U.S. PATENT DOCUMENTS

| | | | |
|---|---|---|---|
| 8,856,490 B2 | 10/2014 | Chen et al. | |
| 2013/0185508 A1* | 7/2013 | Talagala .............. | G06F 12/0871 711/118 |
| 2014/0223079 A1* | 8/2014 | Zhang ................. | G06F 12/0246 711/103 |

(Continued)

FOREIGN PATENT DOCUMENTS

| | | |
|---|---|---|
| KR | 100706242 | 4/2007 |
| KR | 101297442 | 8/2013 |
| KR | 101356543 | 1/2014 |

*Primary Examiner* — Shane D Woolwine
(74) *Attorney, Agent, or Firm* — IP & T Group LLP

(57) ABSTRACT

A memory system may include a memory device comprising a plurality of memory blocks each having a plurality of pages; and a controller suitable for storing data in a first memory block among the memory blocks, storing map data of the data in a second memory block among the memory blocks, and scanning the map data by performing filtering on logical information of the data in response to a command.

18 Claims, 12 Drawing Sheets

(56) References Cited

U.S. PATENT DOCUMENTS

2014/0281145 A1* 9/2014 Tomlin ................ G06F 12/0246
 711/103
2016/0232088 A1* 8/2016 Mohan ................ G06F 12/0246
2017/0060433 A1* 3/2017 Noe ...................... G06F 3/0608

* cited by examiner

MEMORY SYSTEM AND OPERATING METHOD THEREOF USING A BITMAP FOR FILTERING OF LOGICAL ADDRESSES

CROSS-REFERENCE TO RELATED APPLICATIONS

The present application claims priority of Korean Patent Application No. 10-2015-0161626, filed on Nov. 18, 2015, the disclosures of which are incorporated herein in their entirety by reference.

BACKGROUND

1. Field

Exemplary embodiments of the present invention relate to a memory system, and more particularly, to a memory system for processing data to a memory device and an operating method thereof.

2. Description of the Related Art

The computer environment paradigm has shifted to ubiquitous computing systems that can be used anytime and anywhere. As a result, use of portable electronic devices such as mobile phones, digital cameras, and notebook computers continues to increase rapidly. Portable electronic devices generally use a memory system having one or more semiconductor memory devices for storing data. Semiconductor memory devices referred to herein simply as memory device may be used as a main memory device or an auxiliary memory device of a portable electronic device.

Semiconductor memory devices provide excellent stability, durability, high information access speed, and low power consumption, since unlike other type of storage devices they have no moving parts. Examples of semiconductor memory devices having such advantages include universal serial bus (USB) memory devices, memory cards having various interfaces, and solid state drives (SSD).

SUMMARY

Various embodiments of the present disclosure are directed to a memory device, a system and a method of operation thereof which is capable of rapidly and stably processing data to a memory device while reducing the complexity of the memory system, and an operating method thereof.

In an embodiment of the present disclosure, a memory system may include: a memory device comprising a plurality of memory blocks each having a plurality of pages; and a controller suitable for storing data in a first memory block among the memory blocks, storing map data of the data in a second memory block among the memory blocks, and scanning the map data by performing filtering on logical information of the data in response to a command.

The controller may include a memory suitable for storing a bit map for the logical information of the data, wherein the controller generates the bit map for the logical information of the data when storing the map data, and performs the filtering through the bit map stored in the memory.

The controller may generate an ID for the logical information of the data by shifting and grouping the logical information of the data.

The controller may generate the ID for the logical information of the data as the bit map through multiple hashes.

The controller may include a filter suitable for performing the filtering, wherein the controller registers the bit map in a bit array of the filter when storing the map data.

The controller may load map segments of the map data and a map list for the map segments to a memory of the controller, and checks whether a first map segment corresponding to logical information of a command data corresponding to the command exists in the map list, through the filtering.

When the first map segment exists in the map list, the controller may check physical information of the first map segment by scanning the map segments.

The controller may perform a command operation corresponding to the command in the memory blocks, based on the physical information.

The physical information may include a physical page number (PPN) corresponding to the logical information of the command data.

The logical information of the data may include a logical page number (LPN) of the data stored in the first memory block.

In an embodiment of the present disclosure, an operating method of a memory system comprising a plurality of memory blocks each having a plurality of pages may include: storing data in a first memory block among the memory blocks, and storing map data of the data in a second memory block among the memory blocks; and scanning the map data by performing filtering on logical information of the data in response to a command.

The storing of the map data may include generating a bit map for the logical information of the data; and storing the bit map in a memory of a controller.

The scanning of the map data may include performing the filtering through the bit map.

The generating of the bit map may include: generating an ID for the logical information of the data by shifting and grouping the logical information of the data; and generating the ID for the logical information of the data as the bit map through multiple hashes.

The storing of the bit map in the memory of the controller may include: registering the bit map in a bit array of a filter which performs the filtering.

The scanning of the map data may include: loading map segments of the map data and a map list for the map segments to a memory of a controller; and checking whether a first map segment corresponding to logical information of a command data corresponding to the command exists in the map list, through the filtering.

The scanning of the map data may further include checking physical information of the first map segment by scanning the map segments, when the first map segment exists in the map list.

The operating method may further include performing a command operation corresponding to the command in the memory blocks, based on the physical information.

The physical information may include a physical page number (PPN) corresponding to the logical information of the command data.

The logical information of the data may include a logical page number (LPN) of the data stored in the first memory block.

DETAILED DESCRIPTION

Figure 1:
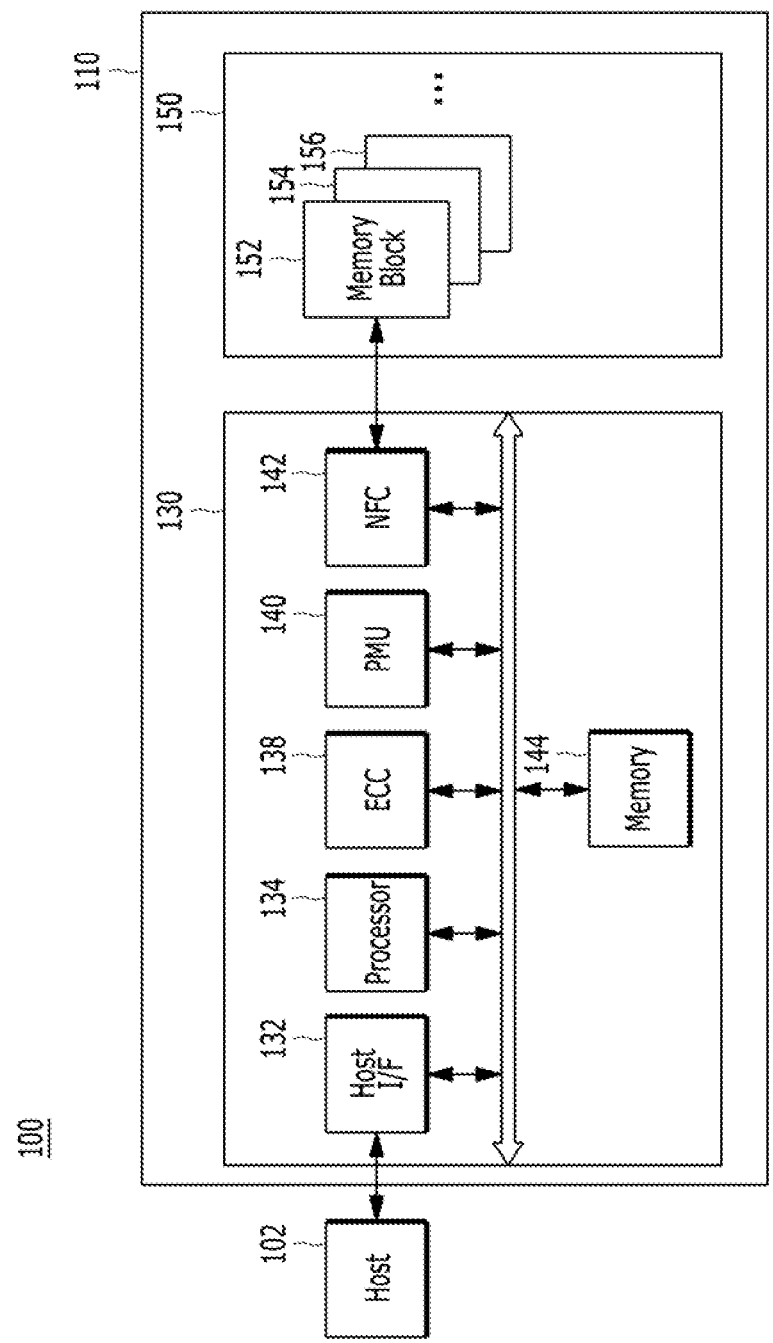
FIG. 1 is a diagram illustrating a data processing system including a memory system in an embodiment of the present invention.

Various embodiments will be described with reference to the accompanying drawings. It is noted, however, that the present invention may, be embodied in different forms and should not be construed as being limited to the embodiments set forth herein. Rather, these embodiments are provided so that this disclosure will be thorough and complete. Throughout the disclosure, like reference numerals are used to refer to like parts in the various figures and embodiments of the present invention. It is noted that in this specification, "connected/coupled" refers to one component not only directly coupling another component but indirectly coupling another component through an intermediate component. In addition, a singular form may include a plural form as long as it is not specifically mentioned otherwise in a sentence. It should be readily understood that the meaning of "on" and "over" in the present disclosure should be interpreted in the broadest manner such that "on" means not only "directly on" but "on" something with an intermediate feature(s) or a layer(s) therebetween, and that "over" means not only directly on top but on top of something with an intermediate feature(s) or a layer(s) therebetween. When a first layer is referred to as being "on" a second layer or "on" a substrate, it not only refers to a case where the first layer is formed directly on the second layer or the substrate but a case where a third layer exists between the first layer and the second layer or the substrate.

Referring to FIG. 1, a data processing system 100 is provided, according to an embodiment of the invention. The data processing system 100 may include a host 102 and a memory system 110.

The host 102 may include any suitable electronic device. For example, the host 102 may include a portable electronic device such as a mobile phone, an MP3 player, a laptop computer and the like. The host may include a non-portable electronic device such as a desktop computer, a game player, a TV, a projector and the like.

The memory system 110 may operate in response to a request from the host 102. For example, the memory system may store data to be accessed by the host 102. The memory system 110 may be used as a main memory system or an auxiliary memory system of the host 102. The memory system 110 may be implemented with any suitable storage device, according to the protocol of a host interface electrically coupled with the host 102. One or more semiconductor memory devices may be used. Volatile or non-volatile memory devices may be used. For example, the memory system 110 may be implemented with a solid state drive (SSD), a multimedia card (MMC), an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device, such as a dynamic random access memory (DRAM) and a static random access memory (SRAM) or a nonvolatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), a resistive RAM (RRAM) and the like.

The memory system 110 may include a memory device 150 which stores data to be accessed by the host 102, and a controller 130 which may control storage of data in the memory device 150.

The controller 130 and the memory device 150 may be integrated into a single semiconductor device. For instance, the controller 130 and the memory device 150 may be integrated into one semiconductor device configured as a solid state drive (SSD). Configuring the memory system 110 as an SSD, may generally allow a significant increase in the operation speed of the host 102.

The controller 130 and the memory device 150 may be integrated into a single semiconductor device configured as a memory card, such as a Personal Computer Memory Card International Association (PCMCIA) card, a compact flash (CF) card, a smart media (SM) card (SMC), a memory stick, a multimedia card (MMC), an RS-MMC and a micro-MMC, a secure digital (SD) card, a mini-SD, a micro-SD and an SDHC, a universal flash storage (UFS) device and the like.

Also, for example, the memory system 110 may be or configure a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID device, or one of various component elements configuring a computing system.

The memory device may store data provided from the host 102 during a write operation, and provide the stored data to the host 102 during a read operation. The memory device 150 may include one or more memory blocks 152, 154 and 156. Each of the memory blocks 152, 154 and 156 may include a plurality of pages. Each of the pages may include a plurality of memory cells to which a plurality of word lines (WL) may be electrically coupled. The memory device 150 may be a nonvolatile memory device retaining stored data when power supply is interrupted. According to an embodiment the memory device may be a flash memory. The memory device may be a flash memory device having a three-dimensional (3D) stack structure. An example of a non-volatile memory device 150 having a three-dimensional (3D) stack structure is described later herein with reference to FIGS. 2 to 11.

The controller 130 of the memory system 110 may control the memory device 150 in response to a request from the host 102. The controller 130 may provide data read from the memory device 150, to the host 102, and store the data provided from the host 102 into the memory device 150. To this end, the controller 130 may control overall operations of the memory device 150, such as read, write, program and erase operations.

Any suitable controller may be used. For example, the controller 130 may include a host interface unit 132, a processor 134, an error correction code (ECC) unit 138, a power management unit 140, a NAND flash controller 142, and a memory 144.

The host interface unit 132 may process commands and/or data provided from the host 102. The host interface unit 132 may communicate with the host 102 through at least one of various interface protocols such as universal serial bus (USB), multimedia card (MMC), peripheral component interconnect-express (PCI-E), serial attached SCSI (SAS), serial advanced technology attachment (SATA), parallel advanced technology attachment (PATA), small computer system interface (SCSI), enhanced small disk interface (ESDI), integrated drive electronics (IDE) and the like.

The ECC unit 138 may detect and correct errors in the data read from the memory device 150 during a read operation. Various detection and correction techniques may be employed. For example, the ECC unit 138 may not correct error bits when the number of the error bits is greater than or equal to a threshold number of correctable error bits, and may output an error correction fail signal indicating failure in correcting the error bits.

The ECC unit 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and the like. The ECC unit 138 may include any and all suitable circuits, systems or devices required for an error detection and correction operation.

The PMU 140 may provide and manage power for the controller 130, that is, power for the component elements included in the controller 130.

The NFC 142 may serve as a memory interface between the controller 130 and the memory device 150 to allow the controller 130 to control the memory device 150 in response to a request from the host 102. The NFC 142 may generate control signals for the memory device 150. The NFC may process data under the control of the processor 134, for example when the memory device 150 is a flash memory and, in particular, when the memory device 150 is a NAND flash memory.

The memory 144 may serve as a working memory of the memory system 110 and the controller 130, and store data for driving the memory system 110 and the controller 130. The controller 130 may control the memory device 150 in response to a request from the host 102. For example, the controller 130 may provide the data read from the memory device 150 to the host 102 and store the data provided from the host 102 in the memory device 150. When the controller 130 controls the operations of the memory device 150, the memory 144 may store data used by the controller 130 and the memory device 150 for such operations as read, write, program and erase operations.

The memory 144 may be implemented with volatile memory. For example, the memory 144 may be implemented with a static random access memory (SRAM) or a dynamic random access memory (DRAM). As described above, the memory 144 may store data used by the host 102 and the memory device 150 for the read and write operations. To store the data, the memory 144 may include a program memory, a data memory, a write buffer, a read buffer, a map buffer, and so forth.

The processor 134 may control one or more general operations of the memory system 110. The processor 134 may control a write operation or a read operation for the memory device 150, in response to a write request or a read request from the host 102. The processor 134 may drive firmware, which is referred to as a flash translation layer (FTL), to control the general operations of the memory system 110. The processor 134 may be implemented with a microprocessor. The processor may be implemented with a central processing unit (CPU).

A management unit (not shown) may be included in the processor 134, and may perform, for example, bad block management of the memory device 150. Accordingly, the management unit may find bad memory blocks included in the memory device 150, which are in unsatisfactory condition for further use, and perform bad block management on the bad memory blocks. When the memory device 150 is a flash memory, for example, a NAND flash memory, a program failure may occur during a write operation due to characteristics of a NAND logic function. Bad block management may program the data of the program-failed memory block or the bad memory block into a new memory block. Bad blocks due to a program fail may deteriorate the utilization efficiency of a memory device, especially one having a 3D stack structure and thus negatively affect the reliability of the memory system 100.

Figure 2:
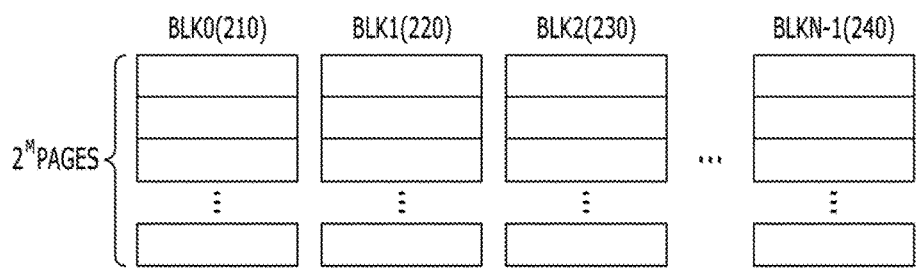
FIG. 2 is a diagram illustrating a memory device in the memory system shown in FIG. 1.

Referring to FIG. 2, according to an embodiment, the memory device 150 may include a plurality of memory blocks, for example, zeroth to $(N-1)^{th}$ blocks 210 to 240. Each of the plurality of memory blocks 210 to 240 may include a plurality of pages, for example, $2^M$ number of pages ($2^M$ PAGES). Each of the plurality of pages may include a plurality of memory cells to which a plurality of word lines are electrically coupled.

The memory blocks may be single level cell (SLC) memory blocks or multi-level cell (MLC) memory blocks, according to the number of bits which may be stored or expressed in each memory cell. The SLC memory block may include a plurality of pages which are implemented with memory cells each capable of storing 1-bit data. The MLC memory block may include a plurality of pages which are implemented with memory cells each capable of storing multi-bit data, for example, two or more-bit data. A MLC memory block including a plurality of pages which are implemented with memory cells that are each capable of storing 3-bit data may be employed and will be referred to as a triple level cell (TLC) memory block.

Each of the plurality of memory blocks 210 to 240 may store data provided from the host device 102 during a write operation, and may provide stored data to the host 102 during a read operation.

Figure 3:
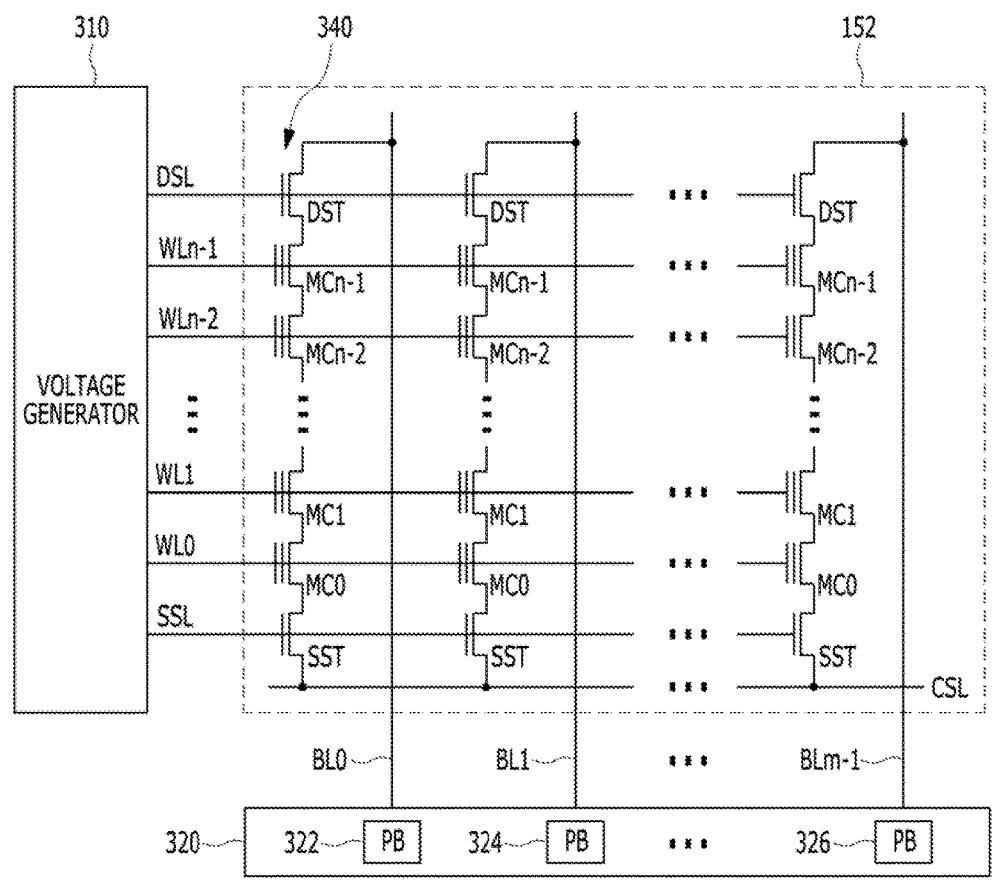
FIG. 3 is a circuit diagram illustrating a memory block in a memory device in an embodiment of the present invention.

Referring to FIG. 3, a memory block 152 of the memory device 150 may include a plurality of cell strings 340 which are electrically coupled to bit lines BL0 to BLm−1, respectively. The cell string 340 of each column may include at least one drain select transistor DST and at least one source select transistor SST. A plurality of memory cells or a plurality of memory cell transistors MC0 to MCn−1 may be electrically coupled in series between the select transistors DST and SST. The respective memory cells MC0 to MCn−1 may be configured by multi-level cells (MLC) each of which stores data information of a plurality of bits. The strings 340 may be electrically coupled to the corresponding bit lines BL0 to BLm−1, respectively. For reference, in FIG. 3, 'DSL' denotes a drain select line, 'SSL' denotes a source select line, and 'CSL' denotes a common source line.

While the memory block 152 is configured by NAND flash memory cells, it is to be noted that the memory block 152 may be realized, in other embodiments, by NOR flash memory, hybrid flash memory in which at least two kinds of memory cells are combined, or one-NAND flash memory in which a controller is built in a memory chip. Also, the operational characteristics of a semiconductor device may be applied to not only a flash memory device in which a charge storing layer is configured by conductive floating gates but also to a charge trap flash (CTF) in which a charge storing layer is configured by a dielectric layer.

A voltage supply block 310 of the memory device 150 may provide word line voltages, for example, a program voltage, a read voltage or a pass voltage, to be supplied to respective word lines according to an operation mode. The voltage supply block 310 may provide voltages to be supplied to bulks, for example, well regions in which the memory cells are formed. The voltage supply block 310 may perform a voltage generating operation under the control of a control circuit (not shown). The voltage supply block 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 150 may be controlled by the control circuit, and may serve as a sense amplifier or a write driver according to an operation mode. During a verification/normal read operation, the read/write circuit 320 may serve as a sense amplifier for reading data from the memory cell array. Also, during a program operation, the read/write circuit 320 may serve as a write driver which drives bit lines according to data to be stored in the memory cell array. The read/write circuit 320 may receive data to be written in the memory cell array, from a buffer (not shown), during the program operation, and may drive the bit lines according to the inputted data. To this end, the read/write circuit 320 may include a plurality of page buffers 322, 324 and 326 respectively corresponding to columns (or bit lines) or pairs of columns (or pairs of bit lines), and a plurality of latches (not shown) may be included in each of the page buffers 322, 324 and 326.

FIGS. 4 to 11 are schematic diagrams illustrating various aspects of a memory device 150.

As shown in FIGS. 4 to 11, the memory device 150 may include a plurality of memory blocks BLK0 to BLKN−1, and each of the memory blocks BLK0 to BLKN−1 may be realized in a three-dimensional (3D) structure or a vertical structure. The respective memory blocks BLK0 to BLKN−1 may include structures which extend in first to third directions, for example, an x-axis direction, a y-axis direction and a z-axis direction.

Figure 8:
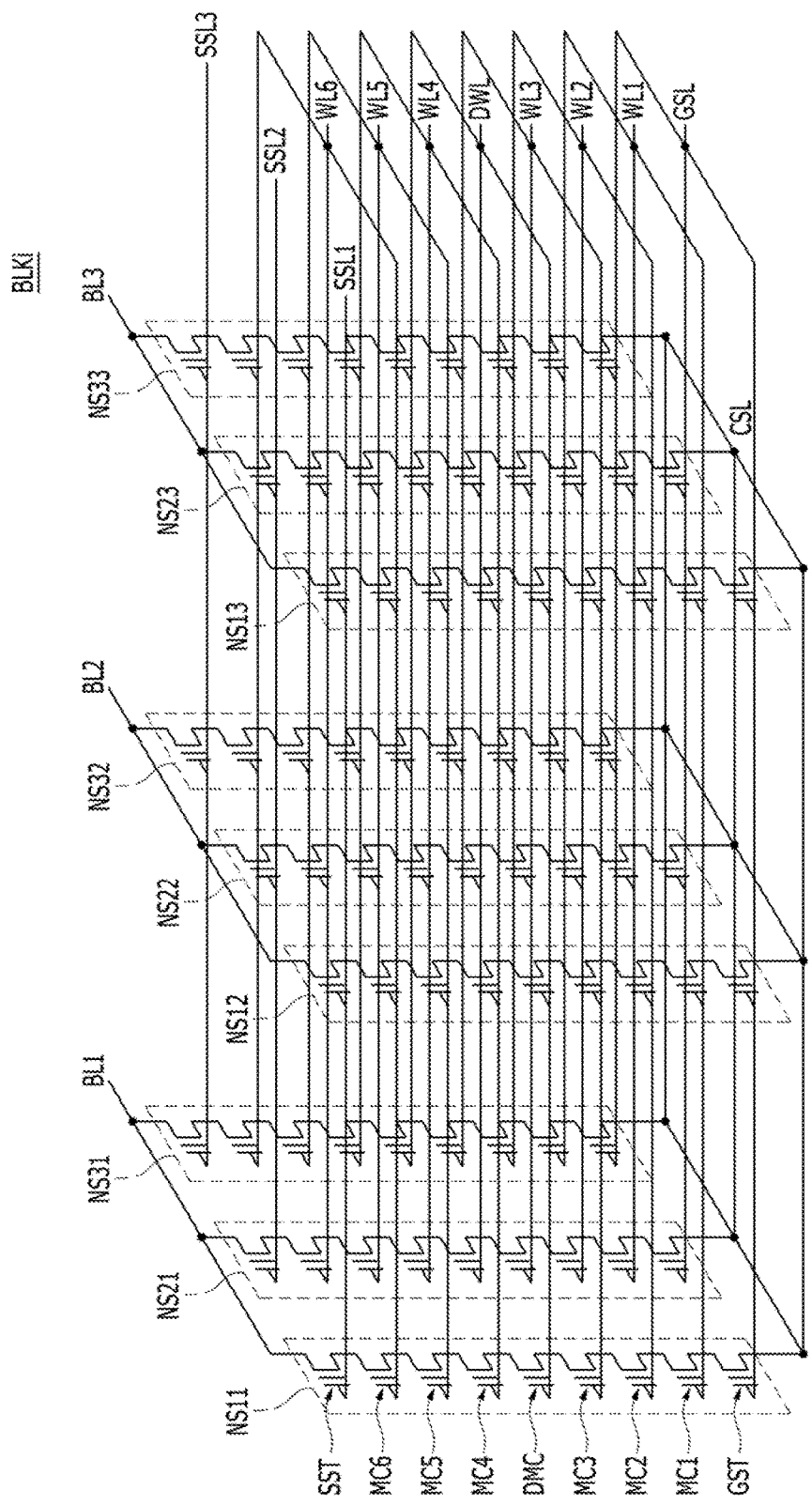

The respective memory blocks BLK0 to BLKN−1 may include a plurality of NAND strings NS which extend in the second direction (FIG. 8). The plurality of NAND strings NS may be provided in the first direction and the third direction. Each NAND string NS may be electrically coupled to a bit line BL, at least one source select line SSL, at least one ground select line GSL, a plurality of word lines WL, at least one dummy word line DWL, and a common source line CSL. The respective memory blocks BLK0 to BLKN−1 may be electrically coupled to a plurality of bit lines BL, a plurality of source select lines SSL, a plurality of ground select lines GSL, a plurality of word lines WL, a plurality of dummy word lines DWL, and a plurality of common source lines CSL.

Figure 4:
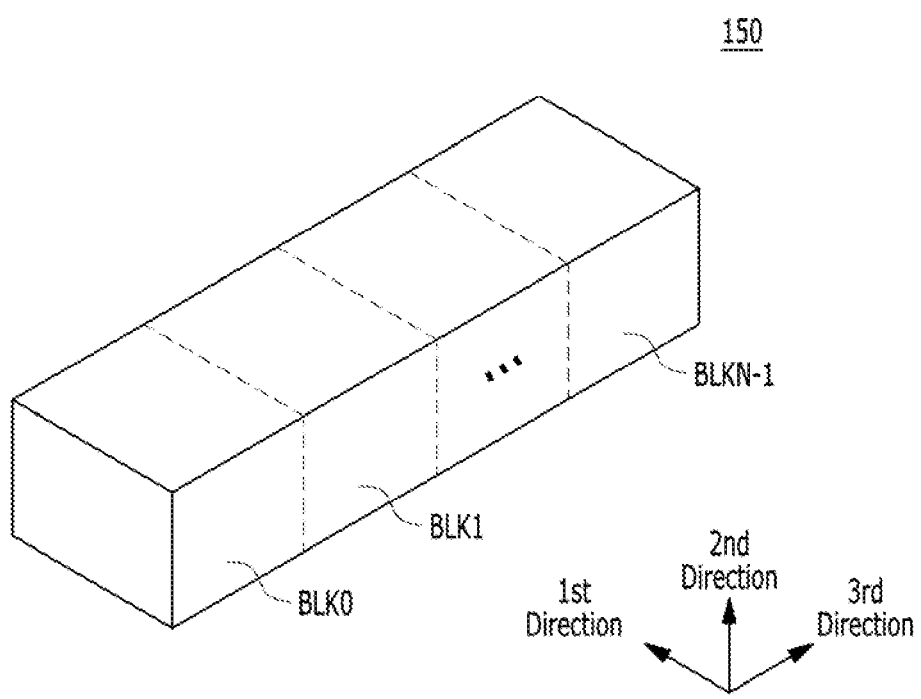
FIGS. 4 to 11 are diagrams schematically illustrating the memory device shown in FIG. 2.
Figure 5:
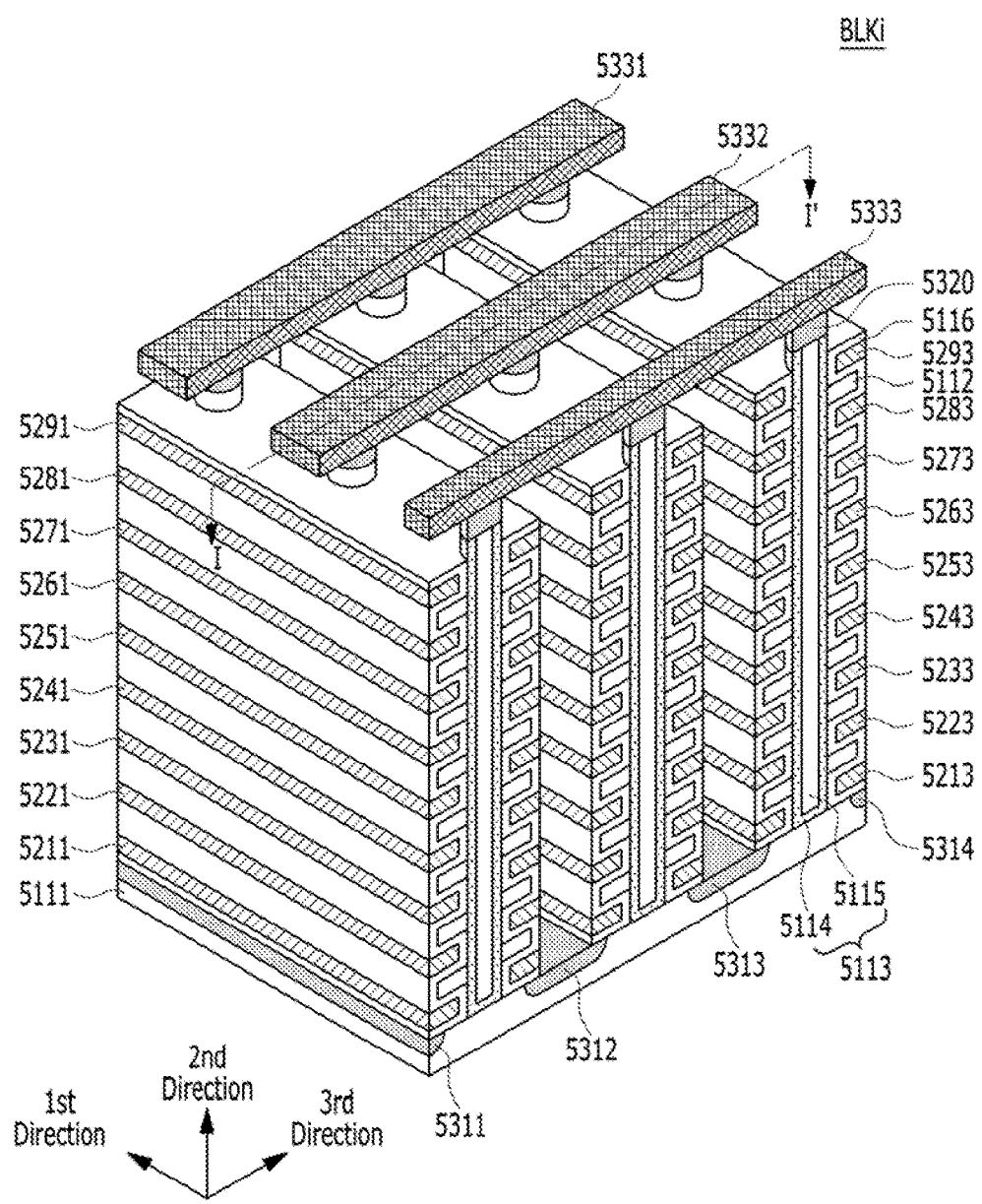
Figure 6:
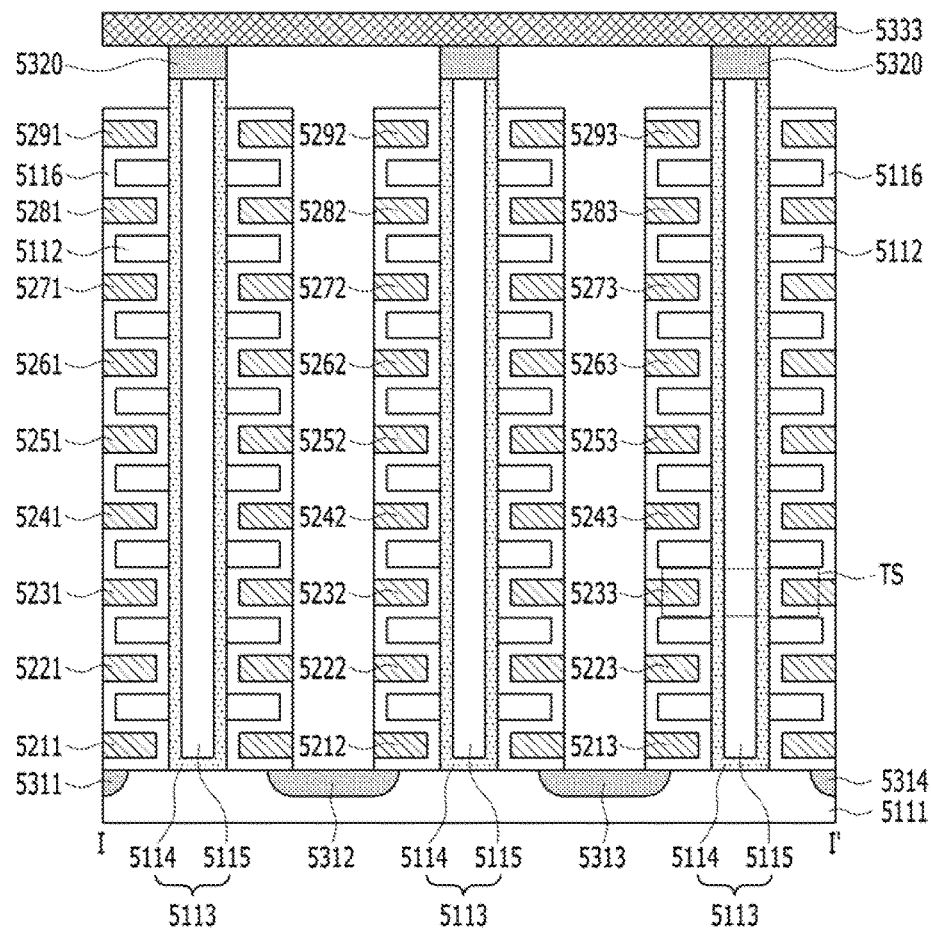

FIG. 5 is a perspective view of one memory block BLKi of the plurality memory blocks BLK0 to BLKN−1 shown in FIG. 4. FIG. 6 is a cross-sectional view taken along a line I-I' of the memory block BLKi shown in FIG. 5.

Referring to FIGS. 5 and 6, memory block BLKi may include a structure which extends in the first to third directions.

The memory block may include a substrate 5111 including a silicon material doped with a first type impurity. For example, the substrate 5111 may include a silicon material doped with a p-type impurity or may be a p-type well, for example, a pocket p-well, and Include an n-type well which surrounds the p-type well. While in the embodiment shown it is assumed that the substrate 5111 is p-type silicon, it is to be noted that the substrate 5111 is not limited to being p-type silicon.

A plurality of doping regions 5311 to 5314 which extend in the first direction may be provided over the substrate 5111. The doping regions are spaced apart at regular intervals in the third direction. The plurality of doping regions 5311 to 5314 may contain a second type of impurity that is different from the impurity used in substrate 5111. For example, the plurality of doping regions 5311 to 5314 may be doped with an n-type impurity. While it is assumed here that first to fourth doping regions 5311 to 5314 are n-type, it is to be noted that the first to fourth doping regions 5311 to 5314 are not limited to being n-type.

In the region over the substrate 5111 between the first and second doping regions 5311 and 5312, a plurality of dielectric material regions 5112 which extend in the first direction may be spaced apart at regular intervals in the second direction. The dielectric material regions 5112 and the substrate 5111 may also be separated from one another by a predetermined distance in the second direction. The dielectric material regions 5112 may include any suitable dielectric material such as, for example, silicon oxide.

In the regions over the substrate 5111 between two consecutive doping regions, for example, between doping regions 5311 and 5312, a plurality of pillars 5113 are spaced apart at regular intervals in the first direction. The pillars 5113 extend in the second direction and may pass through the dielectric material regions 5112 so that they may be electrically coupled with the substrate 5111. Each pillar 5113 may include one or more materials. For example, each pillar 5113 may include an in inner layer 5115 and an outer surface layer 5114. The surface layer 5114 may include a doped silicon material doped with an impurity. For example, the surface layer 5114 may include a silicon material doped with the same or same type impurity as the substrate 5111. While it is assumed here, as an example, that the surface layer 5114 may include p-type silicon, the surface layer 5114 is not limited to being p-type silicon and other embodiments may readily envisaged by the skilled person wherein the substrate 5111 and the surface layer 5114 of the pillars 5113 may be doped with an n-type impurity.

The inner layer 5115 of each pillar 5113 may be formed of a dielectric material. The inner layer 5115 may be or include a dielectric material such as, for example, silicon oxide.

In the regions between the first and second doping regions 5311 and 5312, a dielectric layer 5116 may be provided along the exposed surfaces of the dielectric material regions 5112, the pillars 5113 and the substrate 5111. The thickness of the dielectric layer 5116 may be less than one half of the distance between the dielectric material regions 5112. In other words, a region in which a material other than the dielectric material 5112 and the dielectric layer 5116 may be disposed, may be provided between (i) the dielectric layer 5116 (provided over the bottom surface of a first dielectric material of the dielectric material regions 5112) and (ii) the dielectric layer 5116 provided over the top surface of a second dielectric material of the dielectric material regions 5112. The dielectric material regions 5112 lie below the first dielectric material.

In the regions between consecutive doping regions such as in the region between the first and second doping regions 5311 and 5312, a plurality of conductive material regions 5211 to 5291 may be provided over the exposed surface of the dielectric layer 5116. The plurality of the conductive material regions extend in the first direction and are spaced apart at regular intervals in the second direction in an interleaving configuration with the plurality of the dielectric material regions 5112. The dielectric layers 5116 fill the space between the conductive material regions and the dielectric material regions 5112. So for example, the conductive material region 5211 which extends in the first direction may be provided between the dielectric material region 5112 adjacent to the substrate 5111 and the substrate 5111. In particular, the conductive material region 5211 which extends in the first direction may be provided between (i) the dielectric layer 5116 disposed over the substrate 5111 and (ii) the dielectric layer 5116 disposed over the bottom surface of the dielectric material region 5112 adjacent to the substrate 5111.

Each of the conductive material regions 5211 to 5291 which extends in the first direction may be provided between (i) a dielectric layer 5116 disposed over the top surface of one of the dielectric material regions 5112 and (ii) the dielectric layer 5116 disposed over the bottom surface of the next dielectric material region 5112. The conductive material regions 5221 to 5281 which extend in the first direction may be provided between the dielectric material regions 5112. The conductive material region 5291 which extends in the first direction may be provided over the uppermost dielectric material 5112. The conductive material regions 5211 to 5291 which extend in the first direction may be or include a metallic material. The conductive material regions 5211 to 5291 which extend in the first direction may be or include a conductive material such as polysilicon.

In the region between the second and third doping regions 5312 and 5313, the same structures as the structures between the first and second doping regions 5311 and 5312 may be provided. For example, in the region between the second and third doping regions 5312 and 5313, the plurality of dielectric material regions 5112 which extend in the first direction, the plurality of pillars 5113 which are sequentially arranged in the first direction and pass through the plurality of dielectric material regions 5112 in the second direction, the dielectric layer 5116 which is provided over the exposed surfaces of the plurality of dielectric material regions 5112 and the plurality of pillars 5113, and the plurality of conductive material regions 5212 to 5292 which extend in the first direction may be provided.

In the region between the third and fourth doping regions 5313 and 5314, the same structures as between the first and second doping regions 5311 and 5312 may be provided. For example, in the region between the third and fourth doping regions 5313 and 5314, the plurality of dielectric material regions 5112 which extend in the first direction, the plurality of pillars 5113 which are sequentially arranged in the first direction and pass through the plurality of dielectric material regions 5112 in the second direction, the dielectric layer 5116 which is provided over the exposed surfaces of the plurality of dielectric material regions 5112 and the plurality of pillars 5113, and the plurality of conductive material regions 5213 to 5293 which extend in the first direction may be provided.

Drains 5320 may be respectively provided over the plurality of pillars 5113. The drains 5320 may be silicon materials doped with second type impurities. The drains 5320 may be silicon materials doped with n-type impurities. While it is assumed for the sake of convenience that the drains 5320 include n-type silicon, it is to be noted that the drains 5320 are not limited to being n-type silicon. For example, the width of each drain 5320 may be larger than the width of each corresponding pillar 5113. Each drain 5320 may be provided in the shape of a pad over the top surface of each corresponding pillar 5113.

Conductive material regions 5331 to 5333 which extend in the third direction may be provided over the drains 5320. The conductive material regions 5331 to 5333 may be sequentially disposed in the first direction. The respective conductive material regions 5331 to 5333 may be electrically coupled with the drains 5320 of corresponding regions. The drains 5320 and the conductive material regions 5331 to 5333 which extend in the third direction may be electrically coupled with through contact plugs. The conductive material regions 5331 to 5333 which extend in the third direction may be a metallic material. The conductive material regions 5331 to 5333 which extend in the third direction may be a conductive material such as polysilicon.

In FIGS. 5 and 6, the respective pillars 5113 may form strings together with the dielectric layer 5116 and the conductive material regions 5211 to 5291, 5212 to 5292 and 5213 to 5293 which extend in the first direction. The respective pillars 5113 may form NAND strings NS together with the dielectric layer 5116 and the conductive material regions 5211 to 5291, 5212 to 5292 and 5213 to 5293 which extend in the first direction. Each NAND string NS may include a plurality of transistor structures TS.

Figure 7:
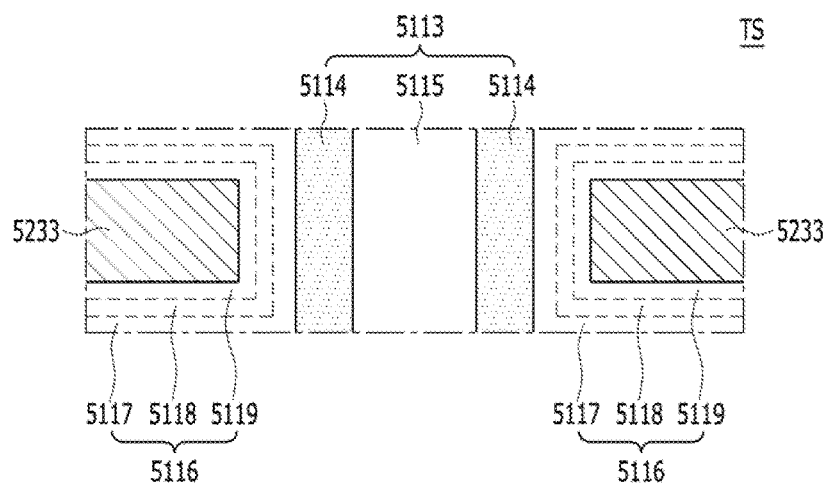

FIG. 7 is a cross-sectional view of the transistor structure TS shown in FIG. 6.

Referring to FIG. 7, in the transistor structure TS shown in FIG. 6, the dielectric layer 5116 may include first to third sub dielectric layers 5117, 5118 and 5119.

The surface layer 5114 of p-type silicon in each of the pillars 5113 may serve as a body. The first sub dielectric layer 5117 adjacent to the pillar 5113 may serve as a tunneling dielectric layer, and may include a thermal oxidation layer.

The second sub dielectric layer 5118 may serve as a charge storing layer. The second sub dielectric layer 5118 may serve as a charge capturing layer, and may include a nitride layer or a metal oxide layer such as an aluminum oxide layer, a hafnium oxide layer, or the like.

The third sub dielectric layer 5119 adjacent to the conductive material 5233 may serve as a blocking dielectric layer. The third sub dielectric layer 5119 adjacent to the conductive material 5233 which extends in the first direction may be formed as a single layer or multiple layers. The third sub dielectric layer 5119 may be a high-k dielectric layer such as an aluminum oxide layer, a hafnium oxide layer, or the like, which has a dielectric constant greater than the first and second sub dielectric layers 5117 and 5118.

The conductive material 5233 may serve as a gate or a control gate. That is, the gate or the control gate 5233, the blocking dielectric layer 5119, the charge storing layer 5118, the tunneling dielectric layer 5117 and the body 5114 may form a transistor or a memory cell transistor structure. For example, the first to third sub dielectric layers 5117 to 5119 may form an oxide-nitride-oxide (ONO) structure. In the embodiment, for the sake of convenience, the surface layer 5114 of p-type silicon in each of the pillars 5113 will be referred to as a body in the second direction.

The memory block BLKi may include the plurality of pillars 5113. Namely, the memory block BLKi may include the plurality of NAND strings NS. In detail, the memory block BLKi may include the plurality of NAND strings NS which extend in the second direction or a direction perpendicular to the substrate 5111.

Each NAND string NS may include the plurality of transistor structures TS which are disposed in the second direction. At least one of the plurality of transistor structures TS of each NAND string NS may serve as a string source transistor SST. At least one of the plurality of transistor structures TS of each NAND string NS may serve as a ground select transistor GST.

The gates or control gates may correspond to the conductive material regions 5211 to 5291, 5212 to 5292 and 5213 to 5293 which extend in the first direction. In other words, the gates or the control gates may extend in the first direction and form word lines and at least two select lines, at least one source select line SSL and at least one ground select line GSL.

The conductive material regions 5331 to 5333 which extend in the third direction may be electrically coupled to one end of the NAND strings NS. The conductive material regions 5331 to 5333 which extend in the third direction may serve as bit lines BL. That is, in one memory block BLKi, the plurality of NAND strings NS may be electrically coupled to one bit line BL.

The second type doping regions 5311 to 5314 which extend in the first direction may be provided to the other ends of the NAND strings NS. The second type doping regions 5311 to 5314 which extend in the first direction may serve as common source lines CSL.

Namely, the memory block BLKi may include a plurality of NAND strings NS which extend in a direction perpendicular to the substrate 5111, e.g., the second direction, and may serve as a NAND flash memory block, for example, of a charge capturing type memory, in which a plurality of NAND strings NS are electrically coupled to one bit line BL.

While it is illustrated in FIGS. 5 to 7 that the conductive material regions 5211 to 5291, 5212 to 5292 and 5213 to 5293 which extend in the first direction are provided in 9 layers, it is to be noted that the conductive material regions 5211 to 5291, 5212 to 5292 and 5213 to 5293 which extend in the first direction are not limited to being provided in 9 layers. For example, conductive material regions which extend in the first direction may be provided in 8 layers, 16 layers or any multiple of layers. In other words, in one NAND string NS, the number of transistors may be 8, 16 or more.

While it is illustrated in FIGS. 5 to 7 that 3 NAND strings NS are electrically coupled to one bit line BL, it is to be noted that the embodiment is not limited to having 3 NAND strings NS that are electrically coupled to one bit line BL. In the memory block BLKi, m number of NAND strings NS may be electrically coupled to one bit line BL, m being a positive integer. According to the number of NAND strings NS which are electrically coupled to one bit line BL, the number of conductive material regions 5211 to 5291, 5212 to 5292 and 5213 to 5293 which extend in the first direction and the number of common source lines 5311 to 5314 may be controlled as well.

Further, while it is illustrated in FIGS. 5 to 7 that 3 NAND strings NS are electrically coupled to one conductive material which extends in the first direction, it is to be noted that the embodiment is not limited to having 3 NAND strings NS electrically coupled to one conductive material which extends in the first direction. For example, n number of NAND strings NS may be electrically coupled to one conductive material which extends in the first direction, n being a positive integer. According to the number of NAND strings NS which are electrically coupled to one conductive material which extends in the first direction, the number of bit lines 5331 to 5333 may be controlled as well.

FIG. 8 is an equivalent circuit diagram illustrating the memory block BLKi having a first structure as described with reference to FIGS. 5 to 7.

Referring to FIG. 8, block BLKi, may have a plurality of NAND strings NS11 to NS31 between a first bit line BL1 and a common source line CSL. The first bit line BL1 may correspond to the conductive material region 5331 of FIGS. 5 and 6, which extends in the third direction. NAND strings NS12 to NS32 may be provided between a second bit line BL2 and the common source line CSL. The second bit line BL2 may correspond to the conductive material region 5332 of FIGS. 5 and 6, which extends in the third direction. NAND strings NS13 to NS33 may be provided between a third bit line BL3 and the common source line CSL. The third bit line BL3 may correspond to the conductive material region 5333 of FIGS. 5 and 6, which extends in the third direction.

A source select transistor SST of each NAND string NS may be electrically coupled to a corresponding bit line BL. A ground select transistor GST of each NAND string NS may be electrically coupled to the common source line CSL. Memory cells MC may be provided between the source select transistor SST and the ground select transistor GST of each NAND string NS.

In this example, NAND strings NS may be defined by units of rows and columns and NAND strings NS which are electrically coupled to one bit line may form one column. The NAND strings NS11 to NS31 which are electrically coupled to the first bit line BL1 may correspond to a first column, the NAND strings NS12 to NS32 which are electrically coupled to the second bit line BL2 may correspond to a second column, and the NAND strings NS13 to NS33 which are electrically coupled to the third bit line BL3 may correspond to a third column. NAND strings NS which are electrically coupled to one source select line SSL may form one row. The NAND strings NS11 to NS13 which are electrically coupled to a first source select line SSL1 may form a first row, the NAND strings NS21 to NS23 which are electrically coupled to a second source select line SSL2 may form a second row, and the NAND strings NS31 to NS33 which are electrically coupled to a third source select line SSL3 may form a third row.

In each NAND string NS, a height may be defined. In each NAND string NS, the height of a memory cell MC1 adjacent to the ground select transistor GST may have a value '1'. In each NAND string NS, the height of a memory cell may increase as the memory cell gets closer to the source select transistor SST when measured from the substrate 5111. For example, in each NAND string NS, the height of a memory cell MC6 adjacent to the source select transistor SST may be 7.

The source select transistors SST of the NAND strings NS in the same row may share the source select line SSL. The source select transistors SST of the NAND strings NS in different rows may be respectively electrically coupled to the different source select lines SSL1, SSL2 and SSL3.

The memory cells at the same height in the NAND strings NS in the same row may share a word line WL. That is, at the same height, the word lines WL electrically coupled to the memory cells MC of the NAND strings NS in different rows may be electrically coupled. Dummy memory cells DMC at the same height in the NAND strings NS of the same row may share a dummy word line DWL. Namely, at the same height or level, the dummy word lines DWL electrically coupled to the dummy memory cells DMC of the NAND strings NS in different rows may be electrically coupled.

The word lines WL or the dummy word lines DWL located at the same level or height or layer may be electrically coupled with one another at layers where the conductive material regions 5211 to 5291, 5212 to 5292 and 5213 to 5293 which extend in the first direction may be provided. The conductive material regions 5211 to 5291, 5212 to 5292 and 5213 to 5293 which extend in the first direction may be electrically coupled in common to upper layers through contacts. At the upper layers, the conductive material regions 5211 to 5291, 5212 to 5292 and 5213 to 5293 which extend in the first direction may be electrically coupled. In other words, the ground select transistors GST of the NAND strings NS in the same row may share the ground select line GSL. Further, the ground select transistors GST of the NAND strings NS in different rows may share the ground select line GSL. That is, the NAND strings NS11 to NS13, NS21 to NS23 and NS31 to NS33 may be electrically coupled to the ground select line GSL.

The common source line CSL may be electrically coupled to the NAND strings NS. Over the active regions and over the substrate 5111, the first to fourth doping regions 5311 to 5314 may be electrically coupled. The first to fourth doping regions 5311 to 5314 may be electrically coupled to an upper layer through contacts and, at the upper layer, the first to fourth doping regions 5311 to 5314 may be electrically coupled.

For example, as shown in FIG. 8, the word lines WL of the same height or level may be electrically coupled. Accordingly, when a word line WL at a specific height is selected, all NAND strings NS which are electrically coupled to the word line WL may be selected. The NAND strings NS in different rows may be electrically coupled to different source select lines SSL. Accordingly, among the NAND strings NS electrically coupled to the same word line WL, by selecting one of the source select lines SSL1 to SSL3, the NAND strings NS in the unselected rows may be electrically isolated from the bit lines BL1 to BL3. In other words, by selecting one of the source select lines SSL1 to SSL3, a row of NAND strings NS may be selected. Moreover, by selecting one of the bit lines BL1 to BL3, the NAND strings NS in the selected rows may be selected in units of columns.

In each NAND string NS, a dummy memory cell DMC may be provided. In FIG. 8, the dummy memory cell DMC may be provided between a third memory cell MC3 and a fourth memory cell MC4 in each NAND string NS. That is, first to third memory cells MC1 to MC3 may be provided between the dummy memory cell DMC and the ground select transistor GST. Fourth to sixth memory cells MC4 to MC6 may be provided between the dummy memory cell DMC and the source select transistor SST. The memory cells MC of each NAND string NS may be divided into memory cell groups by the dummy memory cell DMC. In the divided memory cell groups, memory cells, for example, MC1 to MC3, adjacent to the ground select transistor GST may be referred to as a lower memory cell group, and memory cells, for example, MC4 to MC6, adjacent to the string select transistor SST may be referred to as an upper memory cell group.

Hereinbelow, detailed descriptions will be made with reference to FIGS. 9 to 11, which show a memory device in a memory system, according to another embodiment of the invention.

Figure 9:
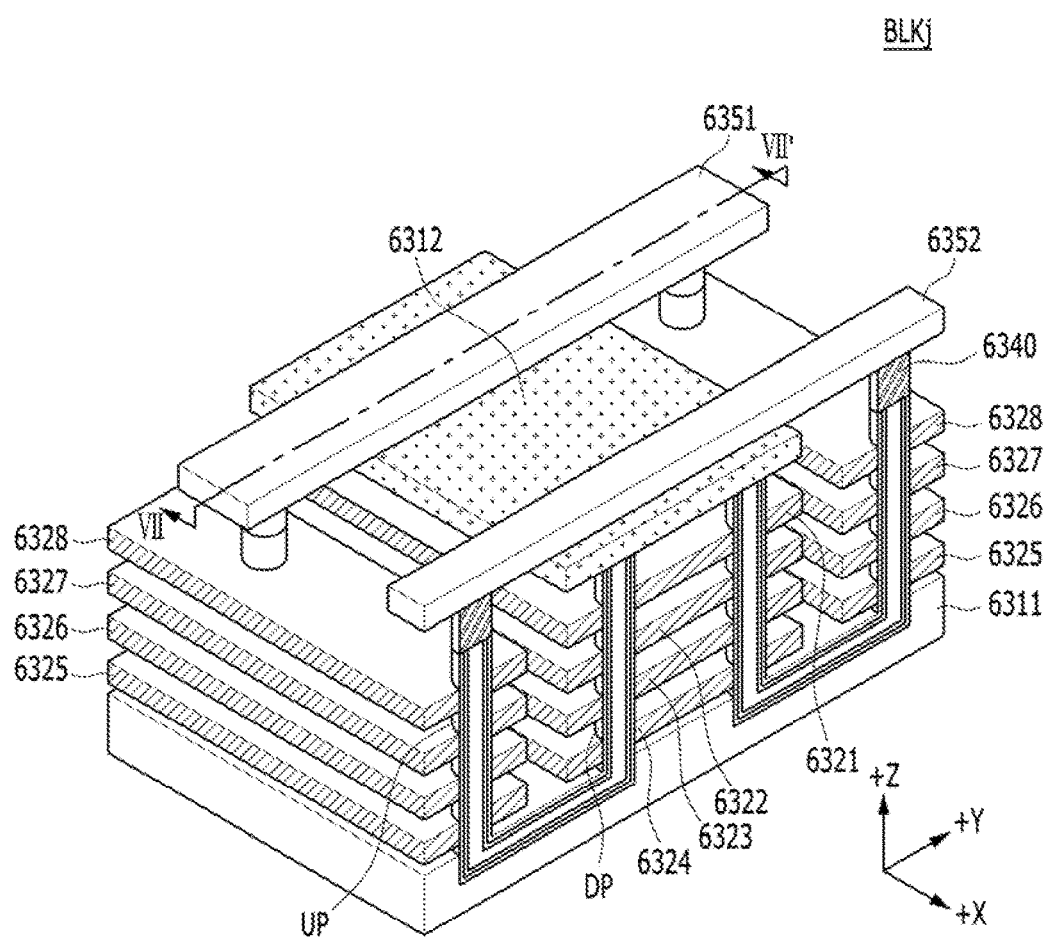

In particular, FIG. 9 is a perspective view schematically illustrating a memory device implemented with a three-dimensional (3D) nonvolatile memory device, which is different from the first structure described above with reference to FIGS. 5 to 8. FIG. 10 is a cross-sectional view illustrating the memory block BLKj taken along the line VII-VII' of FIG. 9.

Figure 10:
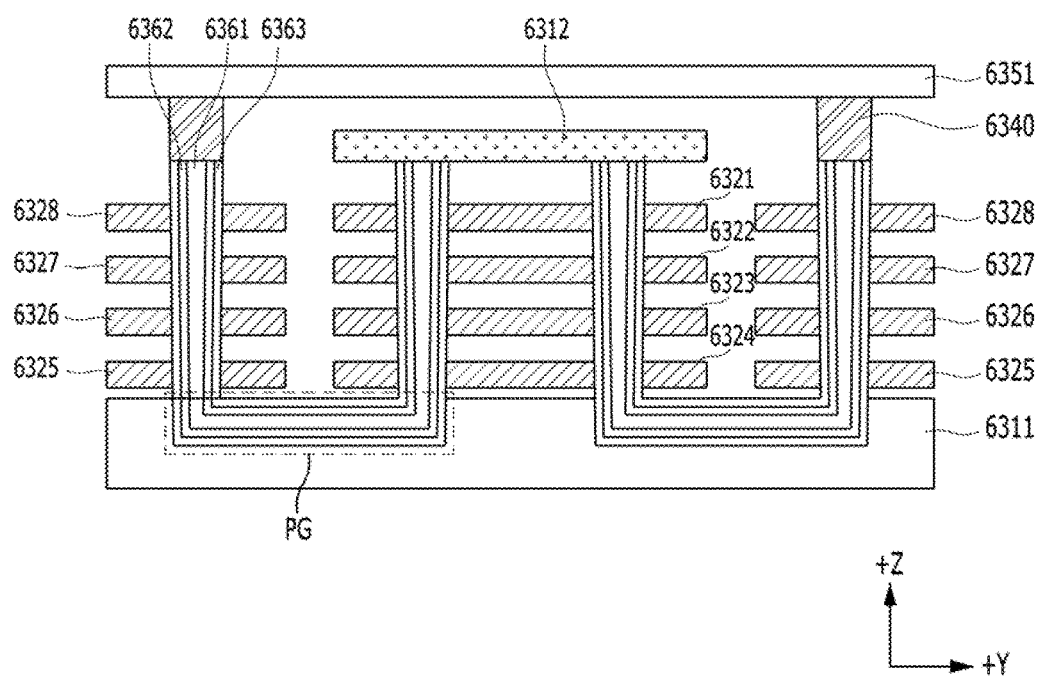

Referring to FIGS. 9 and 10, the memory block BLKj may include structures which extend in the first to third directions and may include a substrate 6311. The substrate 6311 may include a silicon material doped with a first type impurity. For example, the substrate 6311 may include a silicon material doped with a p-type impurity or may be a p-type well, for example, a pocket p-well, and include an n-type well which surrounds the p-type well. While it is assumed in the embodiment shown, that the substrate 6311 is p-type silicon, it is to be noted that the substrate 6311 is not limited to being p-type silicon.

First to fourth conductive material regions 6321 to 6324 which extend in the x-axis direction and the y-axis direction are provided over the substrate 6311. The first to fourth conductive material regions 6321 to 6324 may be separated by a predetermined distance in the z-axis direction.

Fifth to eighth conductive material regions 6325 to 6328 which extend in the x-axis direction and the y-axis direction may be provided over the substrate 6311. The fifth to eighth conductive material regions 6325 to 6328 may be separated by the predetermined distance in the z-axis direction. The fifth to eighth conductive material regions 6325 to 6328 may be separated from the first to fourth conductive material regions 6321 to 6324 in the y-axis direction.

A plurality of lower pillars DP which pass through the first to fourth conductive material regions 6321 to 6324 may be provided. Each lower pillar DP extends in the z-axis direction. Also, a plurality of upper pillars UP which pass through the fifth to eighth conductive material regions 6325 to 6328 may be provided. Each upper pillar UP extends in the z-axis direction.

Each of the lower pillars DP and the upper pillars UP may include an internal material 6361, an intermediate layer 6362, and a surface layer 6363. The intermediate layer 6362 may serve as a channel of the cell transistor. The surface layer 6363 may include a blocking dielectric layer, a charge storing layer and a tunneling dielectric layer.

The lower pillar DP and the upper pillar UP may be electrically coupled through a pipe gate PG. The pipe gate PG may be disposed in the substrate 6311. For instance, the pipe gate PG may include the same material as the lower pillar DP and the upper pillar UP.

A doping material 6312 of a second type which extends in the x-axis direction and the y-axis direction may be provided over the lower pillars DP. For example, the doping material 6312 of the second type may include an n-type silicon material. The doping material 6312 of the second type may serve as a common source line CSL.

Drains 6340 may be provided over the upper pillars UP. The drains 6340 may include an n-type silicon material. First and second upper conductive material regions 6351 and 6352 which extend in the y-axis direction may be provided over the drains 6340.

The first and second upper conductive material regions 6351 and 6352 may be separated in the x-axis direction. The first and second upper conductive material regions 6351 and 6352 may be formed of a metal. The first and second upper conductive material regions 6351 and 6352 and the drains 6340 may be electrically coupled through contact plugs. The first and second upper conductive material regions 6351 and 6352 respectively serve as first and second bit lines BL1 and BL2.

The first conductive material 6321 may serve as a source select line SSL, the second conductive material 6322 may serve as a first dummy word line DWL1, and the third and fourth conductive material regions 6323 and 6324 serve as first and second main word lines MWL1 and MWL2, respectively. The fifth and sixth conductive material regions 6325 and 6326 serve as third and fourth main word lines MWL3 and MWL4, respectively, the seventh conductive material 6327 may serve as a second dummy word line DWL2, and the eighth conductive material 6328 may serve as a drain select line DSL.

The lower pillar DP and the first to fourth conductive material regions 6321 to 6324 adjacent to the lower pillar DP form a lower string. The upper pillar UP and the fifth to eighth conductive material regions 6325 to 6328 adjacent to the upper pillar UP form an upper string. The lower string and the upper string may be electrically coupled through the pipe gate PG. One end of the lower string may be electrically coupled to the doping material 6312 of the second type which serves as the common source line CSL. One end of the upper string may be electrically coupled to a corresponding bit line through the drain 6340. One lower string and one upper string form one cell string which is electrically coupled between the doping material 6312 of the second type serving as the common source line CSL and a corresponding one of the upper conductive material layers 6351 and 6352 serving as the bit line BL.

That is, the lower string may include a source select transistor SST, the first dummy memory cell DMC1, and the first and second main memory cells MMC1 and MMC2. The upper string may include the third and fourth main memory cells MMC3 and MMC4, the second dummy memory cell DMC2, and a drain select transistor DST.

In FIGS. 9 and 10, the upper string and the lower string may form a NAND string NS, and the NAND string NS may include a plurality of transistor structures TS. Since the transistor structure included in the NAND string NS in FIGS. 9 and 10 is described above in detail with reference to FIG. 7, a detailed description thereof will be omitted herein.

Figure 11:
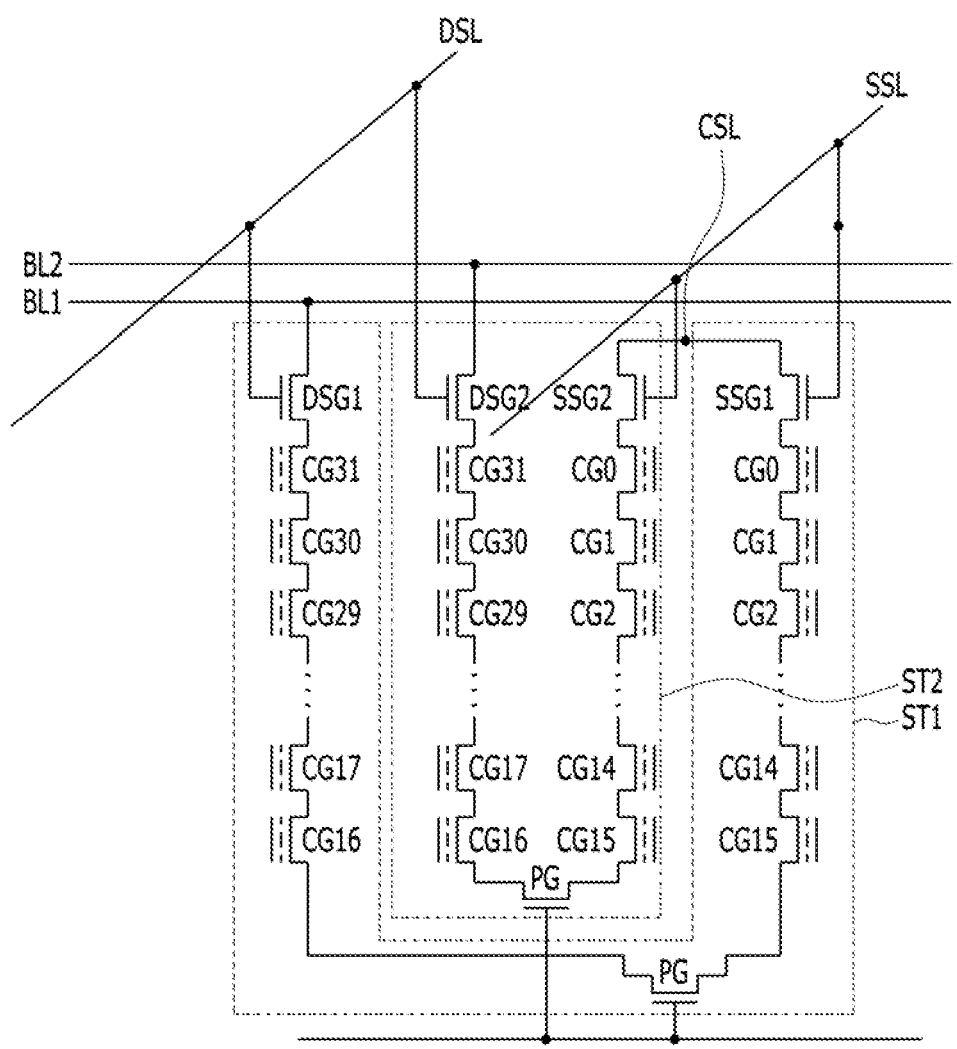

FIG. 11 is a circuit diagram illustrating the equivalent circuit of the memory block BLKj having the second structure as described above with reference to FIGS. 9 and 10. For the sake of convenience, only a first string and a second string, which form a pair in the memory block BLKj in the second structure are shown.

Referring to FIG. 11, in the memory block BLKj having the second structure, cell strings each of which is implemented with one upper string and one lower string electrically coupled through the pipe gate PG as described above with reference to FIGS. 9 and 10, may be provided, in such a way as to define a plurality of pairs.

For example, in the certain memory block BLKj having the second structure, memory cells CG0 to CG31 stacked along a first channel CH1 (not shown), for example, at least one source select gate SSG1 and at least one drain select gate DSG1 may form a first string ST1, and memory cells CG0 to CG31 stacked along a second channel CH2 (not shown), for example, at least one source select gate SSG2 and at least one drain select gate DSG2 may form a second string ST2.

The first string ST1 and the second string ST2 may be electrically coupled to the same drain select line DSL and the same source select line SSL. The first string ST1 may be electrically coupled to a first bit line BL1, and the second string ST2 may be electrically coupled to a second bit line BL2.

While it is described in FIG. 11 that the first string ST1 and the second string ST2 are electrically coupled to the same drain select line DSL and the same source select line SSL, it may be envisaged that the first string ST1 and the second string ST2 may be electrically coupled to the same source select line SSL and the same bit line BL, the first string ST1 may be electrically coupled to a first drain select line DSL1 and the second string ST2 may be electrically coupled to a second drain select line DSL2. Further it may be envisaged that the first string ST1 and the second string ST2 may be electrically coupled to the same drain select line DSL and the same bit line BL, the first string ST1 may be electrically coupled to a first source select line SSL1 and the second string ST2 may be electrically coupled a second source select line SSL2.

Hereafter, an operation of processing data to a memory device in a memory system in accordance with an embodiment of the present invention, for example, an operation of processing command data to the memory device 150 in response to a command received from the host 102, will be described in more detail with reference to FIGS. 12 and 15.

Figure 12:
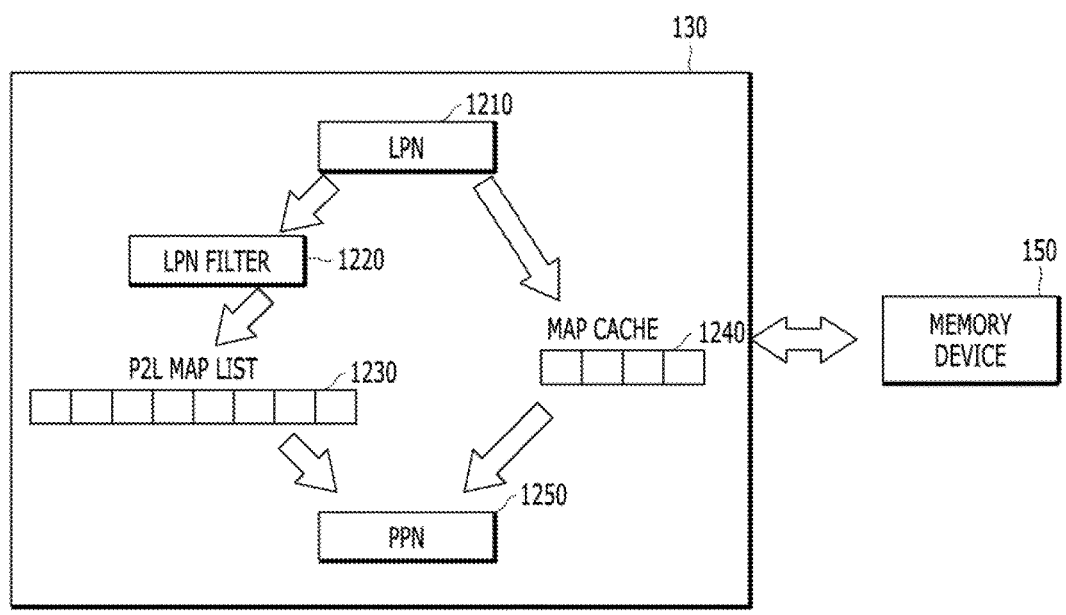
FIGS. 12 to 14 are diagrams for schematically describing a data processing operation of a memory system in an embodiment of the present invention.
Figure 13:
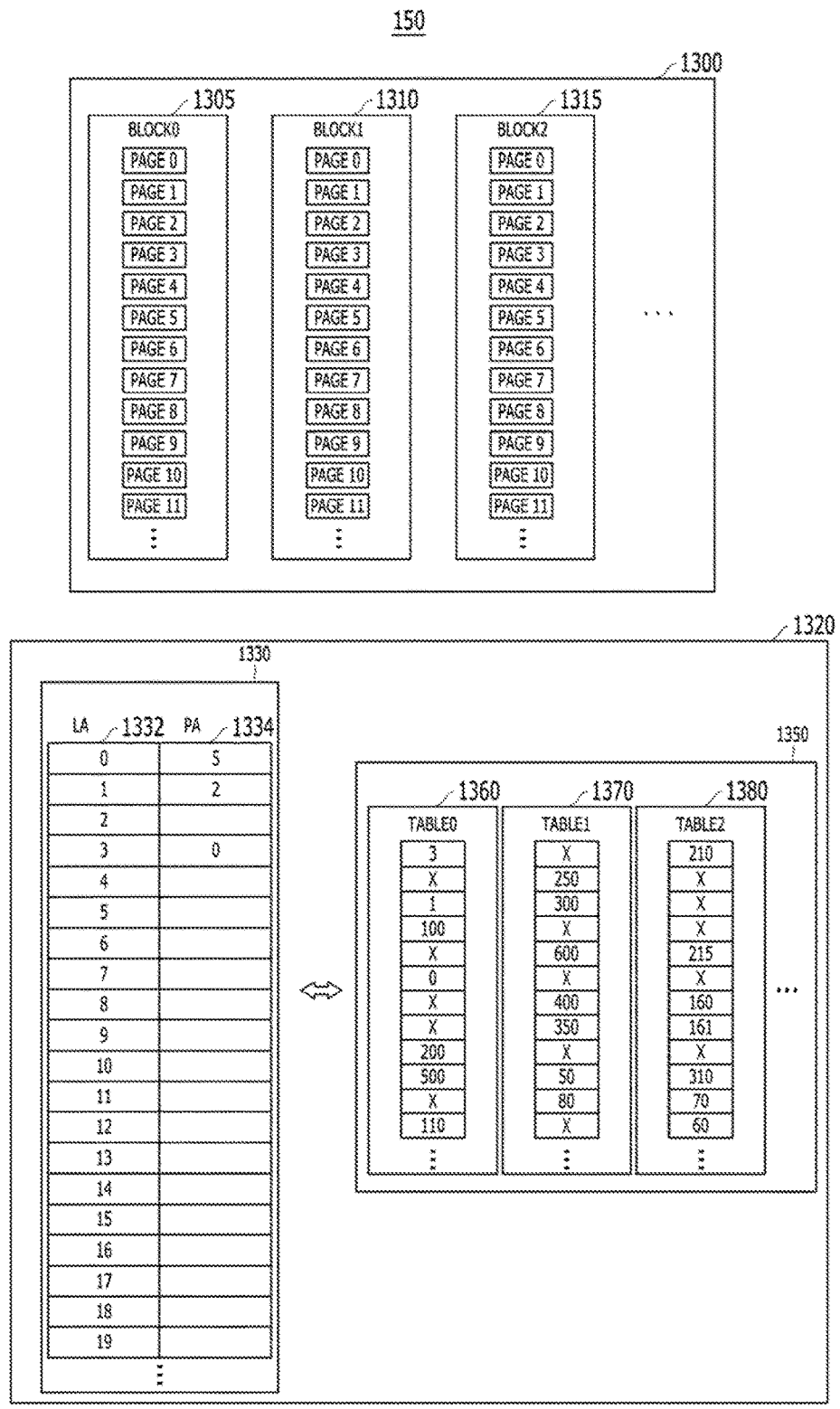
Figure 14:
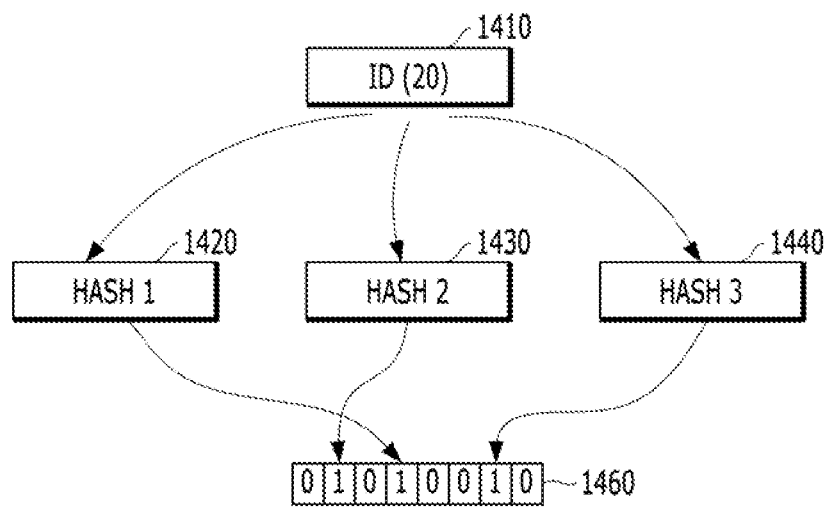

FIGS. 12 to 14 are diagrams for schematically describing a data processing operation of the memory system in the embodiment of the present invention. Hereafter, it is described as an example that the memory system 110 of FIG. 1 performs a command operation corresponding to a command received from the host 102 of FIG. 1. The command operation may include read and write operations, and the memory system 110 may read/write command data corresponding to the command, for example, read and write data corresponding to read and write commands, from/to a plurality of memory blocks included in the memory device 150 of FIG. 1. When performing the command operation, the memory system 110 may temporally store the command data in a buffer/cache included in the memory 144 of the controller 130 of FIG. 1 and performing a scanning operation of searching and checking map data on the command data.

Furthermore, for simple description, it will be described as an example the controller 130 performs the data processing operation of the memory system 110. As described above, however, the processor 134 included in the controller 130 may perform a data processing operation through FTL, for example. When the controller 130 performs a command operation corresponding to a command received from the host 102, the controller 130 may check map data corresponding to the command operation, update the map data according to the command operation, and store the updated map data in the memory blocks of the memory device 150. Whenever performing a command operation in response to a command received from the host 102, the controller 130 may search and check the map data stored in the memory blocks. The map data may include first map data containing L2P (Logical to Physical) address information (hereafter, referred to as logical information) and second map data containing P2L (Physical to Logical) address information (hereafter, referred to as physical information).

In the embodiment of the present invention, when the controller 130 receives a write command from the host 102, the controller 130 may write and store user data corresponding to the write command into an open block or a free block among the memory blocks (i.e., user data blocks) of the memory device 150, and update and store first and second map data corresponding to the user data into an open block or a free block among the memory blocks (i.e., map blocks). The first map data may include an L2P map table containing mapping information between logical addresses and physical addresses on the user data stored in the user data blocks, that is, logical information, and the second map data may include a P2L map table containing mapping information between physical addresses and logical addresses on the user data blocks having the user data stored therein, that is, physical information. Furthermore, when the controller 130 receives a read command from the host 102, the controller 130 may perform a scanning operation of searching for map data of user data corresponding to the read command in the first and second map data stored in the map blocks, and checking user data blocks having the user data stored therein among the memory blocks, read the user data stored in the used data blocks, and provide the read data to the host 102.

In particular, when the controller 130 performs a command operation on user data corresponding to a command received from the host 102, the controller 130 may search for map data of the user data in the first and second map data stored in the map blocks in order to perform the command operation. In other words, the controller 130 may perform a scanning operation of searching for the map data of the user data in logical segments containing logical information of the first map data, for example, L2P segments, and physical segments containing physical information of the second map data, for example, P2L segments, and perform the command operation in the memory blocks for the user data. At this time, the controller 130 may perform filtering on logical information of the user data, for example, a logical page number (LPN), or logical addresses of the user data (LPN filtering), and perform a scanning operation of searching for the LPN of the user data in the logical segments of the first map data and the physical segments of the second map data.

In the present embodiment, when the controller 130 generates and updates the map data or particularly the second map data during a write command operation corresponding to a write command received from the host 102, the controller 130 may write the logical addresses or the LPNs of data programmed to pages of the memory blocks to the P2L map table of the second map data. At this time, the controller 130 may allocate IDs to the LPNs by performing an operation on consecutive LPNs using an arbitrary setting value, generating the IDs in the form of a bit map through multiple hashes, and register the bit map in a bit array of an LPN filter for LPN filtering. For example, the controller 130 may generate the IDs by shifting and grouping LPNs of the data programmed to the pages of the memory blocks using an arbitrary setting value, generate the IDs in the form of bit map through the multiple hashes, and register the IDs in the bit array of the NPN filter.

Furthermore, when the controller 130 searches for the LPN of the user data in the physical segments of the second map data, the controller 130 may perform LPN filtering on the LPNs of the user data through the LPN filter, and check whether the LPN of the user data exists in a second map list, that is, a P2L map list for the P2L segments or check whether a P2L segment corresponding to the LPN of the user data exists. At this time, only when the LPN of the user data exists in the P2L map list, the controller 130 may perform a scanning operation of searching for the LPN of the user data in the physical segments of the second map data.

In other words, when the controller 130 receives a command from the host 102 and performs a command operation corresponding to the command, the controller 130 may check the first and second map data through the map list for the segments of the first and second map data stored in the memory 144 of the controller 130. In particular, in order to check map data of command data corresponding to the command, the controller 130 may load the first and second map data stored in the map blocks among the memory blocks of the memory device 150 to the memory 144 of the controller 130, and check the first and second map data.

That is, when the controller 130 searches for the LPN of the command data in the physical segments of the second map data, the controller 130 may perform LPN filtering on the LPN of the command data through the LPN filter, and check whether a P2L segment corresponding to the LPN of the command data exists in the second map list, that is, the P2L map list for the P2L segments. At this time, only when the P2L segment corresponding to the LPN of the command data exists in the P2L map list, the controller 130 may search for the LPN of the user data in the physical segments of the second map data, or scan for the P2L segment corresponding to the LPN of the command data in the P2L segments of the second map data.

In the present embodiment, the scanning operation for the physical information corresponding to the LPN of the command data among the second map data loaded to the memory 144 of the controller 130 is performed only when the LPN of the command data exists in the map list of the second map data, through the LPN filtering. The number of scanning operations may be minimized. Thus, the controller 130 may minimize the number of searching and checking operations for the map data to perform a command operation corresponding to a command received from the host 102. That is, the controller 130 may improve the access rate to the map data for performing the command operation, thereby rapidly and stably processing the command data corresponding to the command. Hereafter, the data processing operation of the memory system in the embodiment of the present invention will be described in more detail with reference to FIGS. 12 to 14.

First, referring to FIGS. 12 and 13, the controller 130 may write and store data corresponding to a command received from the host 102, for example, user data corresponding to a write command to open blocks 1305, 1310, and 1315 of a data block 1300 among memory blocks of the memory device 150, and store map data on the user data corresponding to the write operation to the data block 1300 in open blocks of a map block 1320 among the memory blocks of the memory device 150.

The controller 130 may store information indicating that the user data are stored in the pages (RAGE0 to PAGE11) of the first to third blocks 1305, 1310, and 1315 (BLOCK0 to BLOCK2) in the memory device 150, for example, L2P information 1330 and P2L information 1350 in the map block 1320 of the memory device 150.

In other words, the controller 130 may program and store the user data corresponding to the write command received from the host 102 into the pages of the first to third blocks 1305, 1310, and 1315 of the memory device 150. Furthermore, the controller 130 may generate map information based on the user data stored in the pages of the first to third blocks 1305, 1310, and 1315, for example, the L2P information 1330 containing information on the logical addresses 1332/physical addresses 1334 (LA/PA) of the user data having LPNs and the P2L information 1350 containing the LPNs of the user data stored in the pages of the first to third blocks 1305, 1310, and 1315. Then, the controller 130 may store the generated L2P information 1330 and the P2L information 1350 in the map block 1320 among the memory blocks of the memory device 150. Furthermore, the user data may be programmed to update the L2P information 1330 and the P2L information 1350.

The L2P information 1330 may include physical map information on the user data stored in the pages of all the memory blocks of the memory device 150, for example, the first to third blocks 1305, 1310, and 1315. An L2P map list for the L2P information 1330, that is, a first map list for the logical segments (L2P segments) of the first map data, may be stored in the memory 144 of the controller 130 or stored in the map block 1320 of the memory device 150, in which the L2P information 1330 is stored. The P2L information 1350 may include logical information on the user data stored in the pages of all the memory blocks of the memory device 150. That is, the P2L information 1350 may include a first table 1360 (TABLE0) containing the LPNs of the user data stored in the respective pages of the first block 1305, a second table 1370 (TABLE1) containing the LPNs of the user data stored in the respective pages of the second block 1310, and a third table 1380 (TABLE2) containing the LPNs of the user data stored in the respective pages of the third block 1315. Furthermore, a P2L map list for the P2L information 1350, that is, a second map list for the physical segments (P2L segments) of the second map data, may be stored in the memory 144 of the controller 130 or stored in the map block 1320 of the memory device 150, in which the L2P Information 1330 is stored.

Furthermore, the controller 130 may include an LPN filter 1220 to perform filtering on the LPN of the command data corresponding to the command received from the host 102, in order to check the map data of the command data. The LPN filter 1220 may be implemented in the controller 130 through FTL, a search engine, or the processor 134 which performs a hashing and shifting operation. Alternatively, the LPN filter 1220 may be implemented inside or outside the controller 130 through separate hardware. Hereafter, it will be described as an example that the LPN filter 1220 is implemented in the controller 130 through FTL, for simple description.

That is, when the map information is generated as the user data corresponding to the write command received from the host 102 are stored in the pages of the first to third blocks 1305, 1310, and 1315, the controller 130 may write the LPNs of the user data to the first to third tables 1360, 1370, and 1380, and allocate IDs to the LPNs of the user data. At this time, the controller 130 may shift and generate the LPNs of successive user data using an arbitrary setting value and allocate an ID to the LPNs of the user data. The controller 130 may generate the ID in the form of a bit map through multiple hashes, and register the bit map in a bit array of the LPN filter 1220 for LPN filtering. Now, referring to FIG. 14, the LPN filter 1220 included in the controller 130 in the memory system 110 in accordance with the embodiment of the present invention will be described in more detail.

Referring to FIG. 14, as the user data are stored in the pages of the first to third blocks 1305, 1310, and 1315, the controller 130 may shift and group the LPNs of the user data, which are written in the first to third tables 1360, 1370, and 1380, using an arbitrary setting value, and allocate IDs to the LPNs of the user data or generate IDs for the LPNs of the user data.

For example, when an arbitrary setting value is '4', the controller 130 may allocate an ID of '0' to the LPNs '0, 1, 2, and 3' of the user data, and allocate an ID of '1' to the LPNs '4, 5, 6, and 7' of the user data. That is, the controller 130 may shift and group the LPNs of the user data, which are written in the first to third tables 1360, a1370, and 1380, based on the arbitrary setting value, and allocate IDs to the LPNs. For example, when data with an LPN 80 (hereafter, referred to as 'data 80') is stored in the page (PAGE10) of the second block 1310 of the memory device 150, information indicating that the data 80 is stored in the page (PAGE10) of the second block 1310 may be stored in the second table 1370. That is, the LPN 80 of the data 80 may be written to the second table 1370, and an ID 1410 of '20') may be allocated to the LPN 80 written in the second table 1370.

After allocating the ID by shifting and grouping the LPNs of the user data, which are written in the first to third tables 1360, 1370, and 1380, the controller 130 may generate a bit map 1460 for the ID through the multiple hashes, for example, first to third hashes (HASH1 to HASH3) 1420, 1430, and 1440. For example, the controller 130 may allocate the ID 1410 of '20' to the LPN 80 written in the second table 1370, and generate the bit map 1460 for the ID 1410 of '20' using the first to third hashes 1420, 1430, and 1440. The controller 130 may configure the LPN filter 1220 by registering the bit map 1460 in the bit array of the LPN filter 1220.

When the controller 130 searches for the LPN 1210 of the user data corresponding to the command received from the host 102 in the physical segments of the second map data, for example, the first to third tables 1360, 1370, and 1380 of the P2L information 1350 stored the map block 1320 of the memory device 150, the controller 130 may perform LPN filtering on the LPN 1210 of the user data through the LPN filter 1220, and check whether the LPN 1210 of the user data exists in the second map list, that is, the P2L map list 1230 for the P2L segments or a P2L segment corresponding to the LPN 1210 of the user data exists in the P2L map list 1230. At this time, only when the LPN 1210 of the user data exists in the P2L map list 1230, the controller 130 may search for the LPN 1210 of the user data in the physical segments of the second map data, for example, the first to third tables 1360, 1370, and 1380 of the P2L information 1350 loaded to the map cache 1240 of the memory 144 included in the controller 130. That is, the controller 130 may scan a P2L segment corresponding to the LPN 1210 of the user data in the P2L segments, and check a PPN (Physical Page Number) 1250 corresponding to the LPN 1210 of the user data, that is, the PPN 1250 of the P2L segment corresponding to the LPN 1210 of the user data.

More specifically, when the controller 130 receives a write/read command and writes/reads data corresponding to the write/read command, the controller 130 may check first and second map data of the data through the map list for the segments of the first and second map data stored in the memory 144 of the controller 130.

In particular, in order to check map data of command data corresponding to a command, the controller 130 may load the first map data, for example, the L2P information 1330 and the second map data, for example, the P2L information 1350, which are stored in the map block 1320 among the memory blocks of the memory device 150, to the memory 144 of the controller 130. At this time, when the L2P map list for the L2P information 1330 and the P2L map list for the P2L information 1350 do not exist in the memory 144 of the controller 130, the L2P map list and the P2L map list, which are stored in the memory device 150, may be loaded to the memory 144.

Furthermore, in order to check the map data of the command data corresponding to the command, the controller 130 may check the L2P information 1330 and the P2L information 1350 which are loaded to the memory 144 of the controller 130. In particular, the controller 130 may perform a scanning operation of searching for the LPN 1210 of the command data in the first to third tables 1360, 1370, and 1380 of the P2L information 1350 loaded to the map cache 1240 of the memory 144. At this time, the controller 130 may perform LPN filtering on the LPN 1210 of the command data through the LPN filter 1220, before performing the scanning operation, and check whether the LPN 1210 of the command data exists in the P2L map list 1230 loaded to the memory 144 or check whether a P2L segment corresponding to the LPN 1210 of the command data exists in the P2L map list 1230.

Furthermore, when the LPN 1210 of the command data exists in the P2L map list 1230, the controller 130 may perform a scanning operation of searching for the LPN 1210 of the command data in the firth to third tables 1360, 1370, and 1380 of the P2L information 1350 loaded to the map cache 1240, that is, the P2L segments. That is, the controller 130 may perform a scanning operation on the LPN 1210 of the command data in the first to third tables 1360, 1370, and 1380 of the P2L information 1350 or scan for a P2L segment corresponding to the LPN 1210 of the command data in the P2L segments of the P2L information 1350. The controller 130 may check a PPN 1250 corresponding to the LPN 1210 of the command data. Then, the controller 130 may perform a command operation on the command data in the memory blocks of the memory device 150 based on the PPN 1250 of the command data. Then, referring to FIG. 15, the data processing operation of the memory system in accordance with the embodiment of the present invention will be described in more detail.

Figure 15:
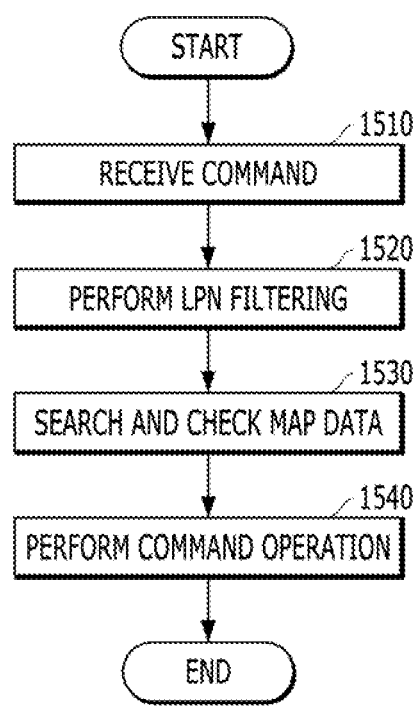
FIG. 15 is a flowchart schematically illustrating the data processing operation of the memory system in the embodiment of the present invention.

FIG. 15 is a flowchart schematically illustrating the data processing operation of the memory system in the embodiment of the present invention.

Accordingly, the memory system may receive a command, for example, a write/read command from a host at step 1510, and perform LPN filtering on the LPN of command data corresponding to the command, before searching and checking map data of the command data, at step 1520.

In order to perform LPN filtering on the LPN of the command data, the memory system may generate and register an ID for the LPN of the command data when generating map data of the command data. That is, when generating second map data containing P2L information for the command data, the memory system may shift and group the LPN of the command data based on an arbitrary setting value, and allocate an ID or generate an ID for the LPN of the command data. The memory system may generate the ID in the form of a bit map through the multiple hashes, register the generated ID in the bit array of the LPN filter which performs LPN filtering, and perform LPN filtering on the LPN of the command data through the LPN filter.

At step 1530, the memory system may check the LPN of the command data in the map list for the map segments of the map data through the LPN filtering. Then, the memory system may search for the LPN of the command data in the map segments of the map data or scan the command data in the map data, and check a PPN corresponding to the LPN of the command data.

At step 1540, the memory system may perform a command operation on the command data in the memory blocks of the memory device, based on the PPN of the command data.

The operation of checking the map data of write data corresponding to a write command received from the host, that is, the operation of performing LPN filtering on the LPN of the write data and checking the PPN corresponding to the LPN of the write data has been described in detail with reference to FIGS. 12 to 14. And thus, the detailed descriptions thereof are omitted herein.

The memory system and the operating method thereof in accordance with the embodiments of the present invention may minimize the performance reduction of the memory system while simplifying the operation of the memory system, thereby rapidly and stably processing data to the memory device.

Although various embodiments have been described for illustrative purposes, it will be apparent to those skilled in the art that various changes and modifications may be made without departing from the spirit and/or scope of the invention as defined in the following claims.

What is claimed is:

1. A memory system comprising:
   a memory device comprising a plurality of memory blocks each having a plurality of pages; and
   a controller suitable for storing data in a first memory block among the memory blocks, storing map data of the data in a second memory block among the memory blocks, and scanning the map data regarding logical information of the data in response to a command,
   wherein the controller generates a bit map for the logical information of the data when storing the map data,
   wherein the controller includes;
   a first part suitable for loading partial map data from the second memory block,
   a second part, including a memory, suitable for storing generated map data including the bit map for the logical information of the data before storing the generated map data in the second memory block, and
   a third part suitable for checking the second part in response to the command to filter by scanning the first part when the second part includes no map data corresponding to the data based on the bit map stored in the memory.

2. The memory system of claim 1, wherein the bit map includes an identifier (ID) for grouping plural logical information of plural data.

3. The memory system of claim 2, wherein the controller generates the ID for grouping the plural logical information of the plural data as the bit map through multiple hashes.

4. The memory system of claim 3, wherein the third part includes:
   a filter suitable for performing the filtering,
   wherein the controller registers the bit map in a bit array of the filter when storing the map data.

5. The memory system of claim 1, wherein the first part loads map segments of the map data and a map list for the map segments to a memory of the controller, and the third part checks whether a first map segment corresponding to logical information of a command data corresponding to the command exists in the map list, through the filtering.

6. The memory system of claim 5, wherein when the first map segment exists in the map list, the controller checks physical information of the first map segment by scanning the map segments.

7. The memory system of claim 6, wherein the controller performs a command operation corresponding to the command in the memory blocks, based on the physical information.

8. The memory system of claim 6, wherein the physical information comprises a physical page number (PPN) corresponding to the logical information of the command data.

9. The memory system of claim 1, wherein the logical information of the data comprises a logical page number (LPN) of the data stored in the first memory block.

10. An operating method of a memory system comprising a plurality of memory blocks each having a plurality of pages, comprising:
   storing data in a first memory block among the memory blocks;
   storing map data of the data in a second memory block among the memory blocks; and
   scanning the map data regarding logical information of the data in response to a command,
   wherein the scanning of the map data includes:
   loading partial map data from the second memory block,
   generating a bit map for the logical information of the data,
   storing generated map data including the bit map for the logical information of the data in a memory before storing the generated map data in the second memory block, and
   checking the generated map data in response to the command to filter by scanning the partial map data when the generated map data includes no map data corresponding to the data based on the bit map stored in the memory.

11. The operating method of claim 10, wherein the bit map includes an identifier (ID) for grouping plural logical information of plural data.

12. The operating method of claim 10, wherein the generating of the bit map comprises:
   generating the identifier (ID) for grouping the logical information of the plural data; and
   generating the ID for the logical information of the data as the bit map through multiple hashes.

13. The operating method of claim 12, wherein the storing of the bit map in the memory of the controller comprises:
   registering the bit map in a bit array of a filter which performs the filtering.

14. The operating method of claim 10, wherein the loading of the partial map data comprises:
   loading map segments of the map data and a map list for the map segments to a memory of a controller, and
   wherein the checking of the generated map data comprises checking whether a first map segment corresponding to logical information of a command data corresponding to the command exists in the map list, through the filtering.

15. The operating method of claim 14, wherein the scanning of the map data further comprises:
   checking physical information of the first map segment by scanning the map segments, when the first map segment exists in the map list.

16. The operating method of claim 15, further comprising:
   performing a command operation corresponding to the command in the memory blocks, based on the physical information.

17. The operating method of claim 15, wherein the physical information comprises a physical page number (PPN) corresponding to the logical information of the command data.

18. The operating method of claim 10, wherein the logical information of the data comprises a logical page number (LPN) of the data stored in the first memory block.

* * * * *